No. 696,549. Patented Apr. 1, 1902.
J. R. CARTER.
CONNECTING DEVICE.
(Application filed Aug. 7, 1901.)
(No Model.) 2 Sheets—Sheet 1.
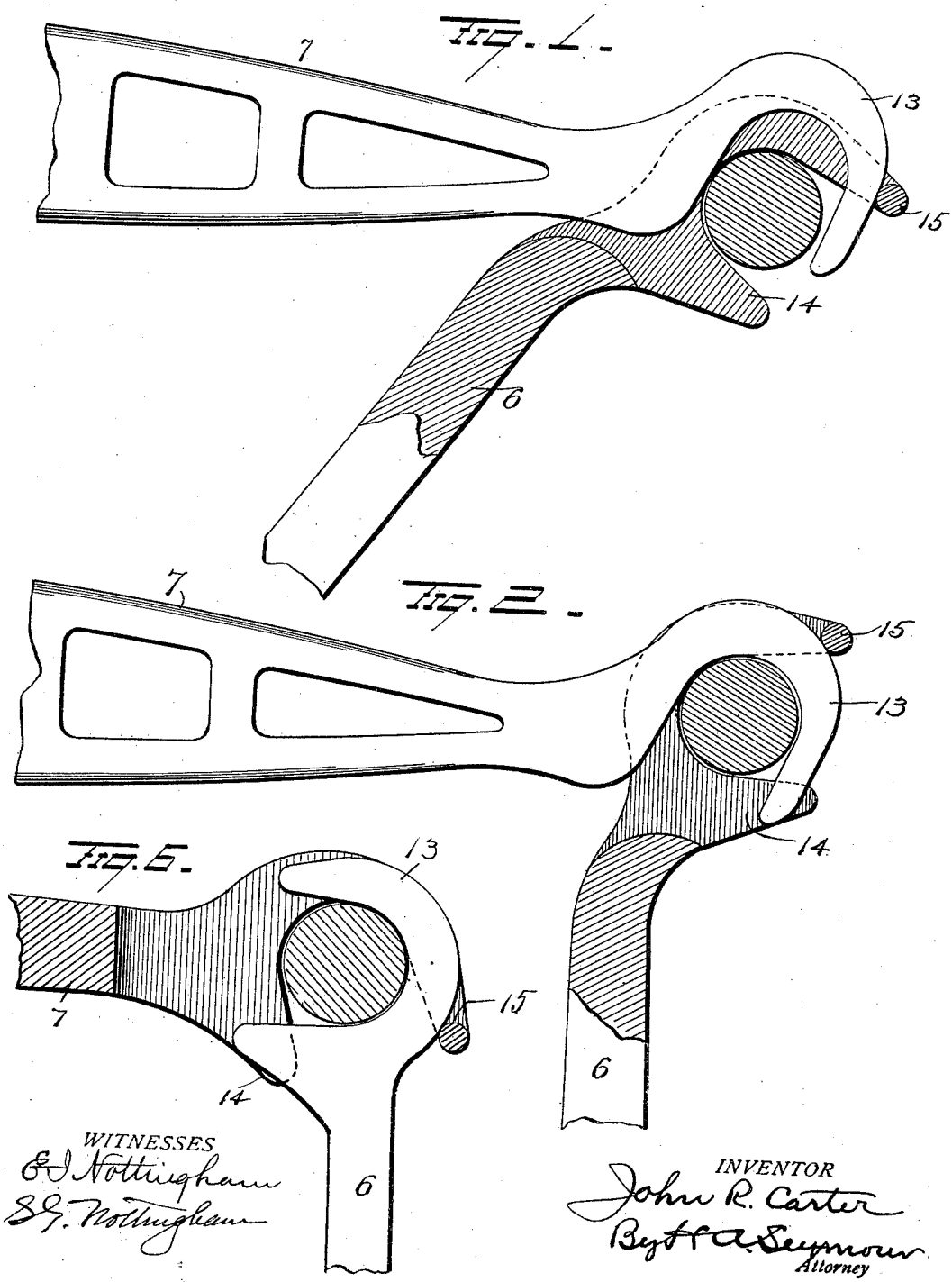

No. 696,549.  
J. R. CARTER.  
CONNECTING DEVICE.  
(Application filed Aug. 7, 1901.)  
Patented Apr. 1, 1902.
(No Model.)
2 Sheets—Sheet 2.
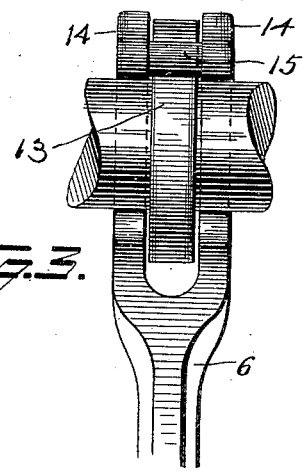
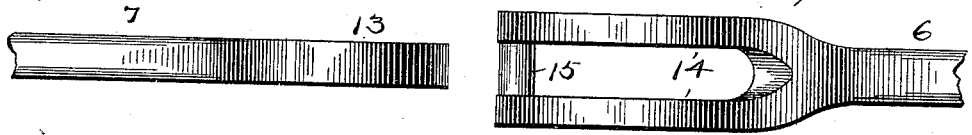
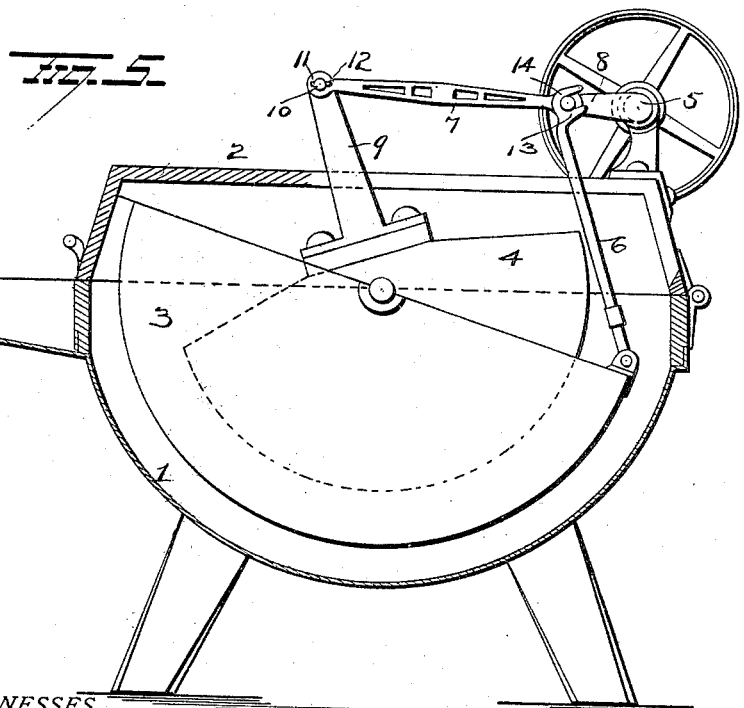
WITNESSES  
INVENTOR  
John R. Carter  
By H. A. Seymour  
Attorney

UNITED STATES PATENT OFFICE.

JOHN R. CARTER, OF AUGUSTA, KENTUCKY, ASSIGNOR TO ERNST H. HUENEFELD, OF CINCINNATI, OHIO.

CONNECTING DEVICE.

SPECIFICATION forming part of Letters Patent No. 696,549, dated April 1, 1902.

Application filed August 7, 1901. Serial No. 71,267. (No model.)

*To all whom it may concern:*

Be it known that I, JOHN R. CARTER, of Augusta, in the county of Bracken and State of Kentucky, have invented certain new and useful Improvements in Connecting Devices; and I do hereby declare the following to be a full, clear, and exact description of the invention, such as will enable others skilled in the art to which it appertains to make and use the same.

My invention relates to an improvement in connecting devices, and more particularly to means for connecting two pitmen with a single crank-shaft in such manner as to permit their easy removal, but which will effectually hold them in position when in operation.

With this object in view the invention consists in certain novel features of construction and combinations and arrangements of parts, as will be more fully hereinafter described, and pointed out in the claims.

In the accompanying drawings, Figures 1, 2, 3, and 4 are enlarged views illustrating my improved connection. Fig. 5 is a view showing my improvements on a washing-machine, and Fig. 6 is a view of a modified form of my invention.

1 represents the body of the washing-machine, and 2 the cover therefor. A lower rubber 3 is mounted to reciprocate in the body 1 and coöperates with an upper rubber 4, also mounted to operate, but in a reverse direction, in said body. A crank-shaft 5 is mounted on the cover of the body 1, and its crank-arm 8 is connected by a pitman 6 with the lower rubber 3. Another pitman 7 is connected at one end with crank-arm 8 of said shaft 5 and at its other end with an upright or lever 9, projecting upward from the upper rubber and located in an elongated slot in the cover 2. It is to the connection between these pitmen and the crank-shaft that my present invention has particular reference.

The upright or lever 9 is provided on one side, at its upper end, with a stud or pintle 10 to receive one end of pitman 7, and said stud is provided at its outer end on one side with a lug or key 11 to aline with a keyway 12 in the pitman 7 when the latter is in a horizontal position and pointing away from the crank-shaft 5, and when the pitman is inserted on the stud it is thrown around to point toward the crank-shaft, and hence cannot become disconnected from the stud during the operation of the washer. The free end of this pitman 7 is provided with a hook 13, adapted to be placed on the crank-arm 8 of shaft 5, and the end of the other pitman 6 is made with double hooks 14, spaced apart sufficiently to receive the hook 13 between them, when all of said hooks will aline and can be inserted on the crank-arm 8. After said hooks are inserted on the crank-arm the pitman 6 is pivotally swung on the crank-arm to move the double hooks 14 out of alinement with the single hook 13 and is then attached to the lower rubber. To prevent the upward movement of single hook 13 and the inward movement of double hooks 14, I extend the free ends of said double hooks 14 slightly beyond their base portions and connect their free ends by an integral rod or pin 15, forming a locking-pin, as will more fully hereinafter appear. This locking-pin 15 may be made in many ways—as, for instance, it might be a separate piece of metal riveted or otherwise secured to the hooks, or it might consist of lugs on the inner face of both or only one of the hooks and perform its functions equally well, and hence I do not confine myself to the precise construction set forth.

In assembling the parts the pitman 7 is first connected to the lever or upright 9, as above explained. The double hooks 14 on pitman 6 are then placed on the upper half of crank-arm 8 and the pitman 7 swung down, the hook 13 on the free end thereof falling down between the double hooks 14, as shown in Fig. 1, when the pitman 6 can be passed down through the slot in the cover and secured to the lower rubber. This movement of pitman 6 serves to move the locking-pin 15 over the outer edge of hook 13 far enough in advance of and below its highest point to prevent the escape of double hooks 14 and also sufficiently far behind its outer extremity to prevent the raising of hook 13. These hooks 13 and 14 may be placed together in various ways and be locked effectually by the locking-pin 15— as, for instance, they might be inserted on the shaft with their prongs pointing in opposite directions and turned to lock them together, as shown in Fig. 6, or the double hooks 14 might be provided on pitman 7 and the single hook on pitman 6. Hence I do not wish to be limited to the particular manner of assembling shown and described.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a pitman connection, the combination of two pitmen and a shaft, double hooks on one pitman spaced apart and adapted to receive the shaft, a single hook on the other pitman adapted to be disposed on the shaft between the double hooks, and a locking-pin on one of the double hooks to engage the single hook and lock all of the hooks on the shaft when either of said hooks is moved out of the position which permits the placing of said hooks on the shaft.

2. In a pitman connection, the combination of two pitmen and a shaft, double hooks on one pitman spaced apart and adapted to receive the shaft, a single hook on the other pitman adapted to be disposed on the shaft between the double hooks, a locking-pin at the free end of the double hooks to engage the single hook and lock all of the hooks on the shaft when either of said hooks is moved out of the position which permits the placing of said hooks on the shaft.

3. In a pitman connection, the combination of two pitmen and a shaft, double hooks on one pitman spaced apart and adapted to receive the shaft, a single hook on the other pitman adapted to be disposed on the shaft between the double hooks, and a locking-pin connecting the free ends of the double hooks to extend over the outer face of the single hook and lock all of the hooks on the shaft when either of said hooks is moved out of the position which permits the placing of said hooks on the shaft.

4. In a pitman connection the combination of two pitmen and a shaft, double hooks on one pitman spaced apart and adapted to receive the shaft, a single hook on the other pitman to be disposed on the shaft between the double hooks, and means on one of the double hooks to extend over the outer face of the single hook and lock all of the hooks on the shaft when either of said hooks is moved out of the position which permits the placing of said hooks on the shaft.

In testimony whereof I have signed this specification in the presence of two subscribing witnesses.

JOHN R. CARTER.

Witnesses:
   S. W. FOSTER,
   G. F. DOWNING.